Dec. 4, 1923.  1,476,010
E. P. TAFT ET AL
COTTON CLEANER
Filed Aug. 12, 1921   3 Sheets-Sheet 2
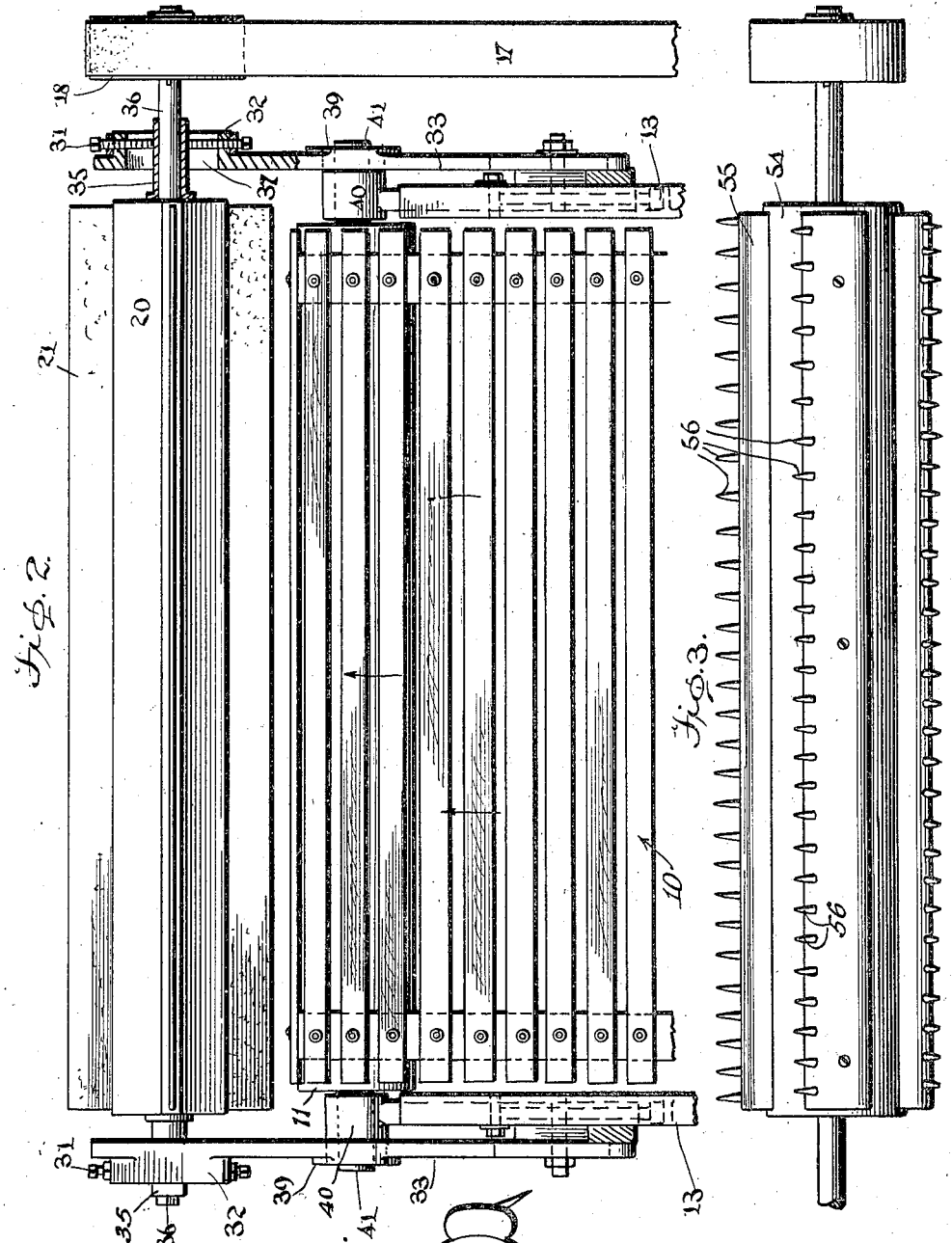
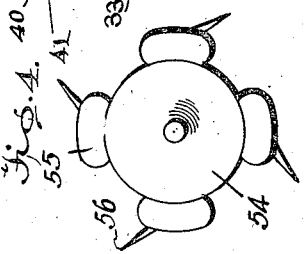
WITNESSES
INVENTORS
E. P. Taft, and
G. Barton,
BY
ATTORNEYS

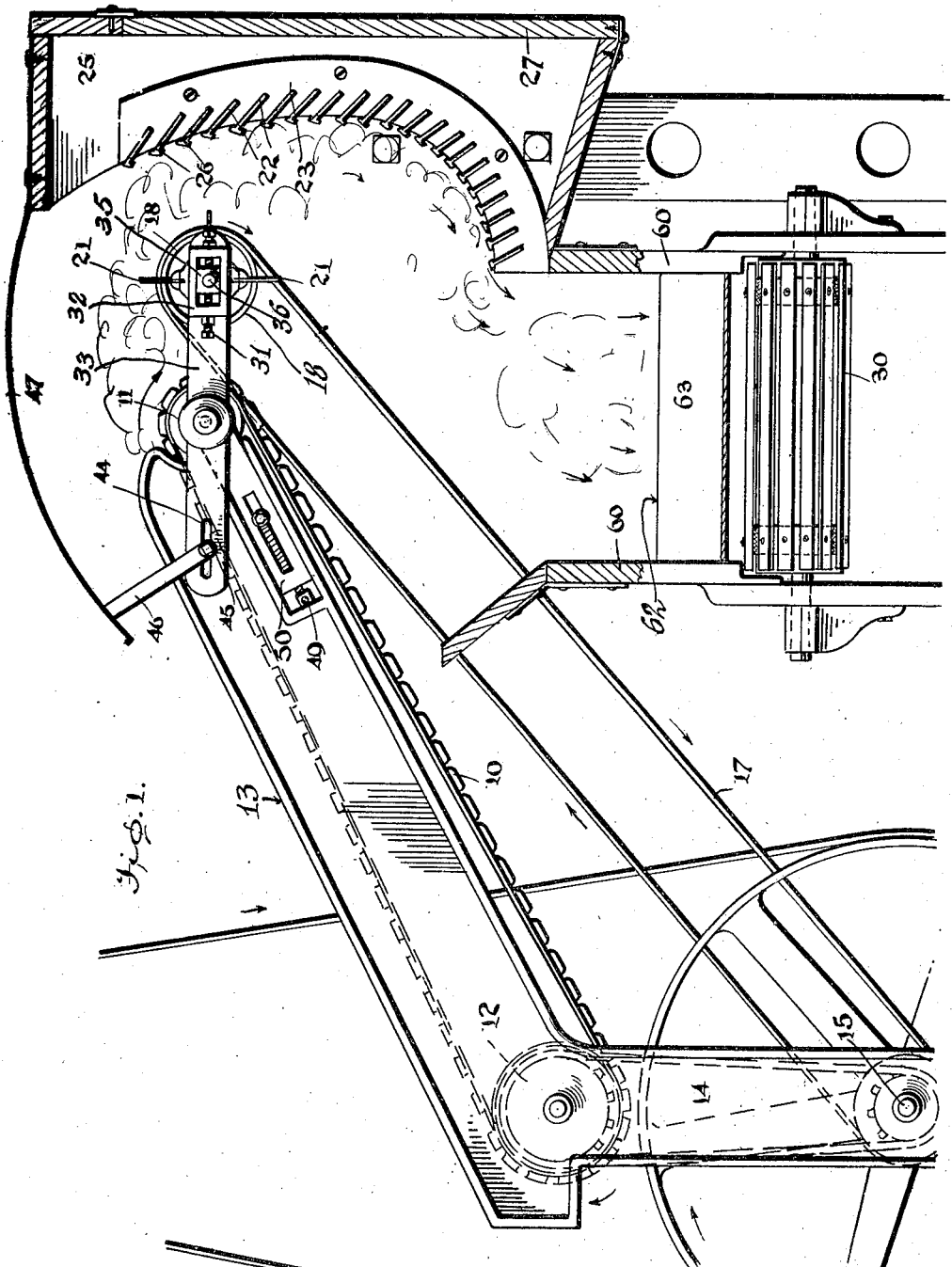

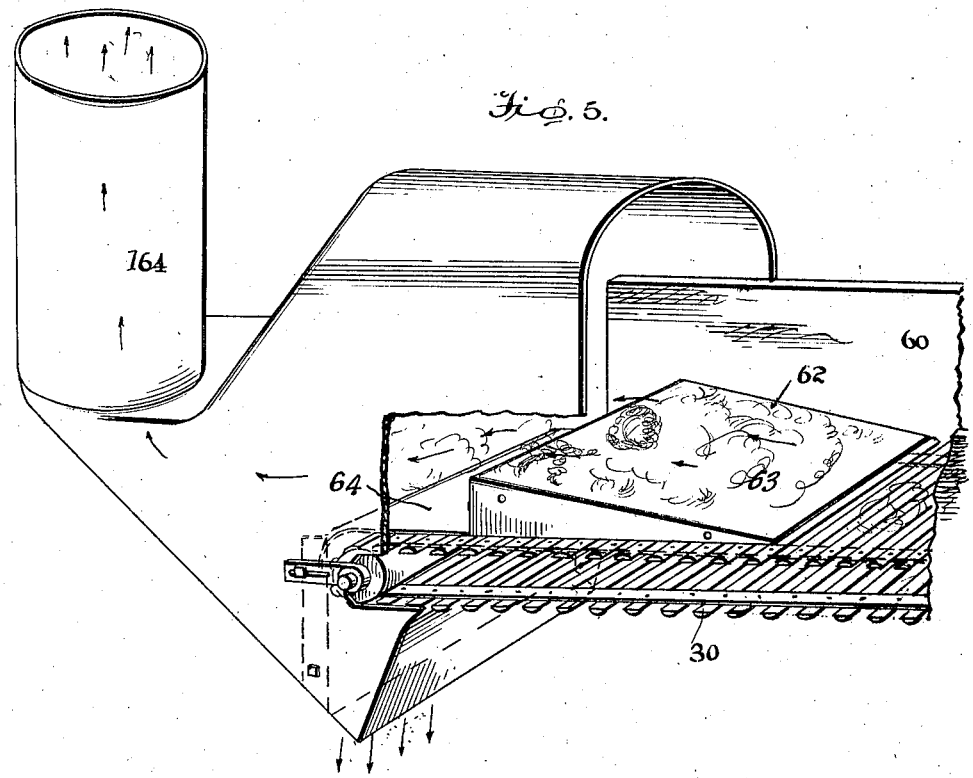
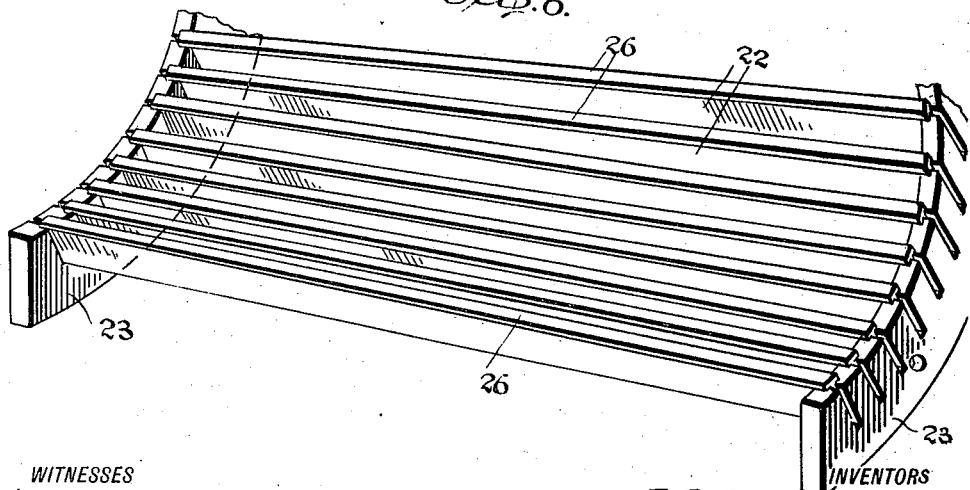

Patented Dec. 4, 1923.

1,476,010

UNITED STATES PATENT OFFICE.

EDWARD PADELFORD TAFT AND GEORGE BARTON, OF AUGUSTA, GEORGIA.

COTTON CLEANER.

Application filed August 12, 1921. Serial No. 491,849.

*To all whom it may concern:*

Be it known that we, EDWARD PADELFORD TAFT and GEORGE BARTON, citizens of the United States, and residents of Augusta, in the county of Richmond and State of Georgia, have invented certain new and useful Improvements in Cotton Cleaners, of which the following is a specification.

This invention relates to cotton cleaners and more particularly to the means for separating the motes, seed and trash from the cotton.

An important object of this invention is to provide a stripping member which breaks the mass of cotton into small lumps, thereby opening the same and not only allowing the motes, seed and trash to be removed, but also prepares the cotton better for action by the pickers in removing foreign matter.

Further, by the use of the invention forming the subject matter of this application, the cotton is delivered to the picker hoppers in a highly fluffy state and thereby produces an even feed to the beaters and a more even lap from the finishers.

A further feature of the invention is the fact that the foreign matter such as the motes and seeds, are removed at a time when the cotton is loose and free to let them drop out of the cotton, whereby the separating process is performed without damage to the cotton.

Other objects and advantages of the invention will be apparent during the course of the following description.

In the accompanying drawings forming a part of this application, and in which like numerals are employed to designate like parts throughout the same, Figure 1 is a vertical sectional view through a mote box and associated elements, Figure 2 is a fragmentary plan view illustrating the rotary strippers, the means for supplying cotton thereto, and the means for adjusting the strippers with relation to the supply means for the same, Figure 3 is an elevation of a slightly modified form of stripper, Figure 4 is an end elevation of the stripper illustrated in Figure 6.

Figure 5 is a fragmentary perspective view illustrating the seed and trash remover, and Figure 6 is a perspective illustrating a plurality of grid bars arranged within the mote box.

In the drawings, wherein for the purpose of illustration is shown a preferred embodiment of the invention, the numeral 10 generally designates an endless conveyor having rollers 11 and 12 supported by brackets 13 or a framework, said brackets being arranged on opposite sides of the conveyor and supported at the ends of standards 14. A drive shaft 15 is connected to the standards 14 and may be connected to the roller 12 in any suitable manner. The drive shaft 15 also has connection with an endless belt 17 having its upper end trained about a roller or pulley 18 of a stripper roll indicated by the numeral 20. The stripper roll is arranged at the upper end of the conveyor 10 and operates on the cotton upon being discharged from the upper end of the conveyor 10.

As illustrated particularly in Figure 2, the stripper roll 20 which may be of wood, is provided with a plurality of longitudinally extending radially arranged strips 21 of stout leather or other material, the said strips being adapted to throw the cotton with considerable force into contact with a plurality of spaced parallel transversely extending grid bars 22. With reference to Figure 6, it will be observed that the grid bars 22 are extended at their ends into slots formed in a pair of longitudinally curved brackets or attaching members 23 secured to the sides of a mote box generally designated by the numeral 25. As the cotton is thrown violently into engagement with the enlarged heads 26 of the grid bars 22, the loose foreign particles and a portion of the seeds are removed from the cotton and dropped into the lower portion of the mote box, so the same may be removed by opening a door 27. It will be observed that the series of grid bars 22 extend inwardly and thereby operate on the cotton until the same is discharged onto a conveyor 30.

It might be stated that the stripper roll 20 may be readily and conveniently adjusted with relation to the upper end of the conveyor 10 by means of set screws 31 carried by the opposite sides of laterally projecting enlargements 32 formed at the ends of stripper roll supporting arms 33. As illustrated clearly in Figures 1 and 2, the laterally projecting enlargements 32 are hollow and slidably receive bearings 35 which are engaged by the set screws 31 and securely held in a certain position. The bearings 35 rotatably receive shafts 36 formed at the ends of the stripper roll, one of the shafts forming a supporting means for the pulley 18. When it is desired to adjust the stripper roll 20 with relation to the upper end of the apron or conveyor 10, it is merely necessary to rotate the set screws 31 in the proper direction and thereby move the bearings 35 in the slots 37 formed in the enlargements 32.

The intermediate portions of the arms 33 are formed with openings or bosses 39 which receive portions of the bearings 40 which form a supporting means for the shafts 41 of the roller 11. The other ends of the arms 33 are formed with longitudinal slots 44 which receive attaching bolts 45. Straps 46 are also held in position by the bolts 45 and form a supporting means for the longitudinally curved shield 47 which prevents the particles of cotton from flying out of the mote box.

The upper roller 11 of the conveyor 10 may be adjusted in the usual manner by set screws 49 which are threaded into bearings 50 for supporting the roller 11.

In carrying out the invention, the construction of the stripper roll may be modified as illustrated in Figure 3, wherein the same is designated by the numeral 54 and is provided with spaced ribs 55 having tangentially arranged spikes 56 which function in a manner similar to the stout leather strips. The spikes 56 may be secured in the ribs 55 by any suitable manner.

The cotton and the matter contained therein, falls down over the grid bars onto a conveyor 30 arranged within a trough having upstanding side walls 60. As the material is conveyed along the member 30, it approaches a seed and dirt remover 62 arranged immediately above the conveyor and having an inclined surface 63 which elevates the cotton and the matter contained therein. When the cotton and the dirt or seed reaches the upper end of the inclined surface 63 the same is subjected to a rather strong current of air from a suction pipe 164 and the heavier particles, such as the seeds, are dropped down onto an apron 64 which is extended over one end of the conveyor 30. The strip or trash-receiving board 64 extends downwardly and terminates below the conveyor 30 so that the material separated from the cotton is discharged beneath the conveyor. It will be seen that as the cotton is conveyed up the inclined surface 63 partly by the movement of the cotton on the conveyor and partly by the suction, the heavier particles, such as the seed, will drop down onto the dirt discharging apron 64 and be separated from the cotton.

With reference to the foregoing description, it will be noted that the cotton is conveyed by the apron 10 into contact with the stripper roll 20, whereupon the leather strips of the stripper roll throw the cotton with considerable force against the grid bars of the mote box. The cotton falls over the grid bars onto the conveyor 30 and is carried toward the seed and trash remover. At this point, the cotton is pushed up by the apron onto the inclined surface 63, until drawn by suction into the intake pipe 164. The seeds being heavier than the cotton, are released by the previous processes, fall onto the apron 64 and are discharged to the floor by gravity. In operation as the cotton is beaten off the apron by the beater 20 it is in such a form that a close setting of the beater to the conveyor 10 would clog the cotton between the roller and the beater and the grid section. The cotton strikes the first few grids with such a force that the "humps" of the same have a tendency to break up as they fly down over the grids. This causes the motes, leaves and other foreign matter to be shaken out and through the grids into the mote box. If the grids were set closer to the beater than illustrated the material would strike the grids with such a force that good cotton would be forced through the grids with the foreign matter.

The cotton which drops onto the conveyor 30 moves up on the inclined surface of the member 62 and is subjected to the suction in the pipe 164. Figure 5 illustrates that the upper end of the inclined member of the seed and dirt remover is connected to the apron 54 by means of a vertical connecting portion or step and consequently the seeds and dirt which are dropped onto the apron 64 are not subjected to the action of the suction. The foreign matter that is taken from the cotton and remains on the apron is more or less covered by the cotton on the apron and is not subjected to the air suction. The foreign matter drops onto the apron and is thrown onto the floor and the quantity of trash, etc. that accumulates during the day is considerable.

By the use of the improved separating system, the stripper roll breaks the mass of cotton up into small lumps, thereby opening the same better to allow the motes, seeds and trash to be removed by the box mote and seed remover. Also, this action prepares the cotton better for the action of the pickers in removing foreign matter, the more fluffy state in which the cotton is delivered to the picker hoppers having a tendency to make a more even feed to the beaters and therefore a more even lap from the finishers.

The invention removes the foreign matter such as the motes and seeds, at a time when the cotton is loose and will more readily give up the foreign matter contained therein. The foreign matter is not subjected to drafts sufficiently strong to lift the same and therefore, the suction of the air contained in the pipe 64 will effectively remove the cotton from the seed.

We claim:—

1. A cotton cleaner comprising a cotton conveyor, a seed and dirt remover mounted on the conveyor and having an inclined elevator portion in the path of travel of the cotton and an apron arranged beneath the upper discharge end of said inclined elevator portion to receive the dirt and seeds dropped therefrom, and suction means to pick up the cotton as it leaves the upper end of said inclined portion.

2. A cotton cleaner comprising a cotton conveyor, a seed and dirt remover mounted on the conveyor and having an inclined elevator portion in the path of travel of the cotton and an apron arranged beneath the upper discharge end of said inclined elevator portion to receive the dirt and seeds dropped therefrom, and suction means to pick up the cotton as it leaves the upper end of said inclined portion, there being a vertical connecting portion between the inclined portion and the apron.

3. A cotton cleaner comprising a cotton conveyor, a seed and dirt remover mounted on the conveyor and having an inclined elevator portion in the path of travel of the cotton and an apron arranged beneath the upper discharge end of said inclined elevator portion to receive the dirt and seeds dropped therefrom, and suction means to pick up the cotton as it leaves the upper end of said inclined portion, said apron being curved downwardly over one end of the conveyor.

4. In a cotton cleaning machine, the combination with a conveyor, of an inclined member arranged at one end of the conveyor for elevating the cotton, and suction means to remove the cotton from the elevated end of said inclined member, while the seed and other matter in the cotton drops from the elevated end of said inclined member.

5. A cotton cleaning machine comprising a conveyor, a stationary board arranged at the discharge end of said conveyor and having an inclined surface over which the cotton is passed, and suction means to withdraw the cotton from the inclined surface of said board, while the heavier particles of material drop from the elevated end of the inclined surface.

EDWARD PADELFORD TAFT.

GEORGE X BARTON.
his
mark